Jan. 6, 1970

W. J. WOSTL ET AL 3,487,640

METHOD AND APPARATUS FOR DETECTING RUMBLE IN AN INTERNAL
COMBUSTION ENGINE

Filed Sept. 3, 1965

INVENTORS.
WOLFGANG J. WOSTL
JOSEPH A. HEINTZ
CHARLES A. LEASE

BY McLean, Morton, and Boustead

ATTORNEYS.

INVENTORS.
WOLFGANG J. WOSTL
JOSEPH A. HEINTZ
CHARLES A. LEASE
BY McLean, Morton, and Boustead
ATTORNEYS.

INVENTORS.
WOLFGANG J. WOSTL
JOSEPH A. HEINTZ
CHARLES A. LEASE

BY McLean, Morton, and Boustead

ATTORNEYS.

United States Patent Office 3,487,640
Patented Jan. 6, 1970

3,487,640
METHOD AND APPARATUS FOR DETECTING RUMBLE IN AN INTERNAL COMBUSTION ENGINE
Wolfgang J. Wostl, South Holland, Joseph A. Heintz, Calumet City, and Charles A. Lease, Chicago, Ill., assignors to Sinclair Research, Inc., New York, N.Y., a corporation of Delaware
Filed Sept. 3, 1965, Ser. No. 484,792
Int. Cl. G01n 25/20, 33/22
U.S. Cl. 73—35
7 Claims

ABSTRACT OF THE DISCLOSURE

An apparatus for and a method of detecting rumble in an internal combustion engine. Fuel introduced into a combustion chamber is ignited, and the rate of change of pressure ($dP/dt$) within the chamber is monitored. When $dP/dt$ exceeds a predetermined threshold, a signal is registered by a counter. Two counters can be alternatively switched to the circuit to enable counting of signals registered under different conditions, for example at constant compression ratio and at changing compression ratio. The signal can be maintained for one cycle of the combustion chamber to insure that false indications of more than one rumble are not registered.

---

The present invention relates to an apparatus and method for analyzing the operational characteristics of an engine, e.g., an internal combustion engine, and more particularly to an apparatus and method for detecting and rating the rumble tendencies of automotive fuels and deposits in an internal combustion engine by utilizing the rate of pressure rise in the combustion chamber.

Rumble may be defined as abnormal engine combustion initiated by multiple deposit sources, and occurring somewhat earlier in the engine cycle than would be the case with the normal spark plug source. Rumble is recognized as a distinct noise, different from knock, pre-ignition and other undesirable types of combustion. It is associated with high compression ratio engines, is experienced as a low-pitched noise in the 600 to 1600 c.p.s. frequency range, and is objectionable to the vehicle operator and potentially harmful to the engine.

It is an object of the present invention to provide an apparatus and a method for detecting and rating the rumble tendencies of automotive fuels and deposits in engines, especially for purposes of testing fuels and fuel additives. The present invention is based upon the recognition that combustion, under rumble conditions, is accompanied by a more rapid than normal pressure rise which can be identified by displaying both the combustion pressure and the sound associated with rumble on a dual beam cathode ray oscilloscope (C.R.O.). This rapid pressure rise, in fact, applies a force, carried through the piston and connecting rod to the crankshaft where mechanical vibrations create the audible manifestations associated with rumble. In ruggedly constructed engines, however, such as the single cylinder engines used in laboratory research, the audible indications of rumble may be difficult to detect, even when the C.R.O. shows the characteristic combustion pressure pattern of rumble. Accordingly, it is a further object of the present invention to provide an apparatus and method for detecting and rating the rumble tendencies of automotive fuels and deposits in such single cylinder internal combustion engines.

In general, the apparatus of the present invention includes means for detecting the rate of pressure change ($dP/dt$) in the cylinder of an engine and means for producing a characteristic signal indicating when the $dP/dt$ exceeds a predetermined threshold even though the ruggedly constructed test engine does not experience audible rumble as would a conventional multi-cylinder engine. The instrument threshold is established by relating a C.R.O. $dP/dt$ signal from a multi-cylinder engine to its corresponding rumble noise level. The invention also programs compression ratio adjustments for the engine and a means for recording the number of times the $dP/dt$ signals exceed the threshold at each compression ratio and during the compression ratio changes. Utilizing the apparatus of this invention, a record of the number or rumbles that have occurred during a time interval for several compression ratios, as well as a record of the rumble during the times the compression ratio is being changed, can be obtained. Both sets of numbers are useful in evaluating the rumble characteristics of a fuel.

The invention and its objects may be more fully understood from the following description when it is read in conjunction with the accompanying drawing wherein.

Figure 2:
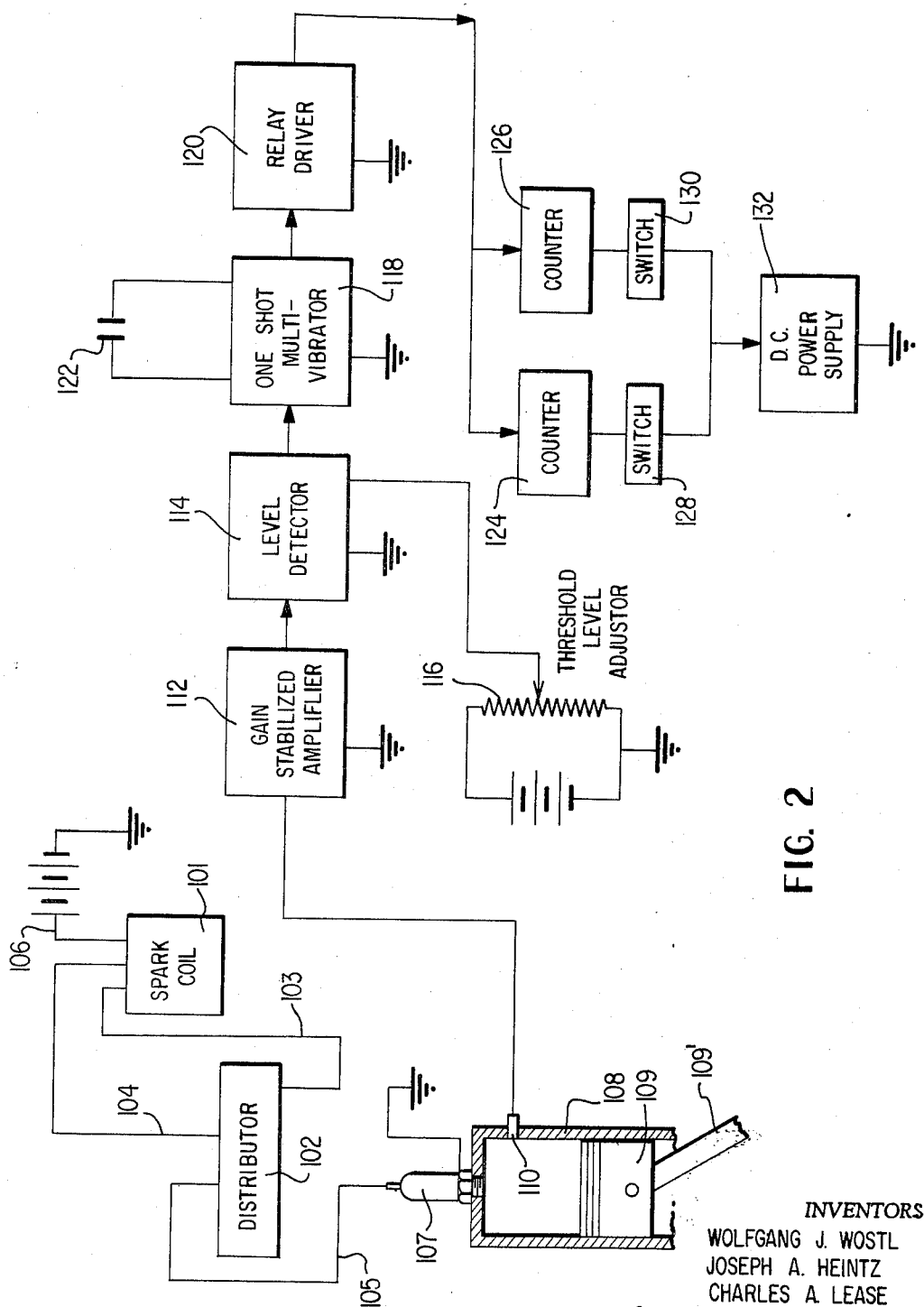
FIGURE 2 is a diagrammatic showing of the apparatus according to the invention, including the relationship thereof to the conventional combustion chamber of a spark ignition internal combustion engine and a block diagram of the electrical and electronic components of the apparatus with a representative indication of the functions performed by each of these components.

Referring now to FIGURE 2, in the diagrammatic showing of the apparatus provided, the numeral 101 designates the ignition or spark coil of an internal combustion engine which is conventionally connected to a distributor 102 for such engine by primary and secondary leads 103 and 104, respectively. Conductor 105 is provided for the individual connection of the illustrated spark plug 107 with the spark coil 101. Spark plug 107 is arranged in a cylinder, e.g. combustion chamber 108 which is supplied fuel, e.g. gasoline, by conventional means (not shown). The numeral 106 designates the connection of the ignition to the battery. Piston 109 which is arranged in cylinder 108 is operatively connected to the crankshaft (not shown) by means including rod 109'. In use, discharge of spark coil 101 creates a pulse in the primary lead 103 which is passed to the spark plug 107 which sparks and normally causes burning of the fuel in the combustion chamber 108. Combustion of the fuel creates a pressure rise in chamber 108 to move piston 109 and turn the crankshaft.

Figure 4:
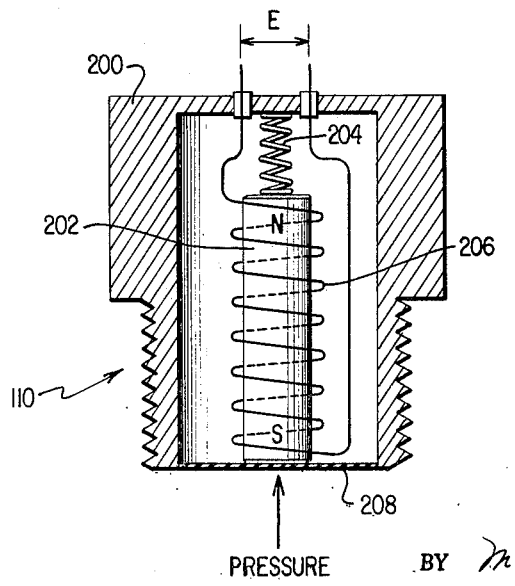
FIGURE 4 illustrates a rate of pressure change pickup means for use in the present invention.

FIGURE 2 also shows in block diagram the components of the apparatus that sense and record the presence of rumble. A pickup 110 is installed in the combustion chamber 108 of the engine. Pickup 110 has an output, i.e. an electrical pulse, that is proportional to the rate of change of pressure $dP/dt$ and, for example, can be the device illustrated in FIGURE 4 which includes a casing 200 containing a permanent magnet core 202 suspended on a spring 204 and passing through, i.e., surrounded by, an induction coil 206. A diaphragm 208 covers the end of casing 200 which is placed in chamber 108.

The applied pressure in chamber 108 moves the diaphragm 208 which in turn moves the permanent magnet 202 while the induction coil 206 is held stationary. Operation of this pickup is as follows: If $\phi$ is the number of magnetic flux lines and N is the number of turns in the induction coil 206, the induced E.M.F. (E) is proportional to the rate of change of the number of flux lines, $$E = N \frac{d\phi}{dt}$$

and since motion of magnet 202 causes the magnetic flux lines to be changed witth respect to the wires of the induction coil 206, this motion induces an E.M.F. (E) which is proportional to the rate of change of the number of flux lines. Therefore the E.M.F. (E) induced in coil 206 is proportional to the rate of pressure change in chamber 108. A signal proportional to the rate of pressure change can also be obtained by differentiating a signal corresponding to an absolute pressure.

Figure 1:
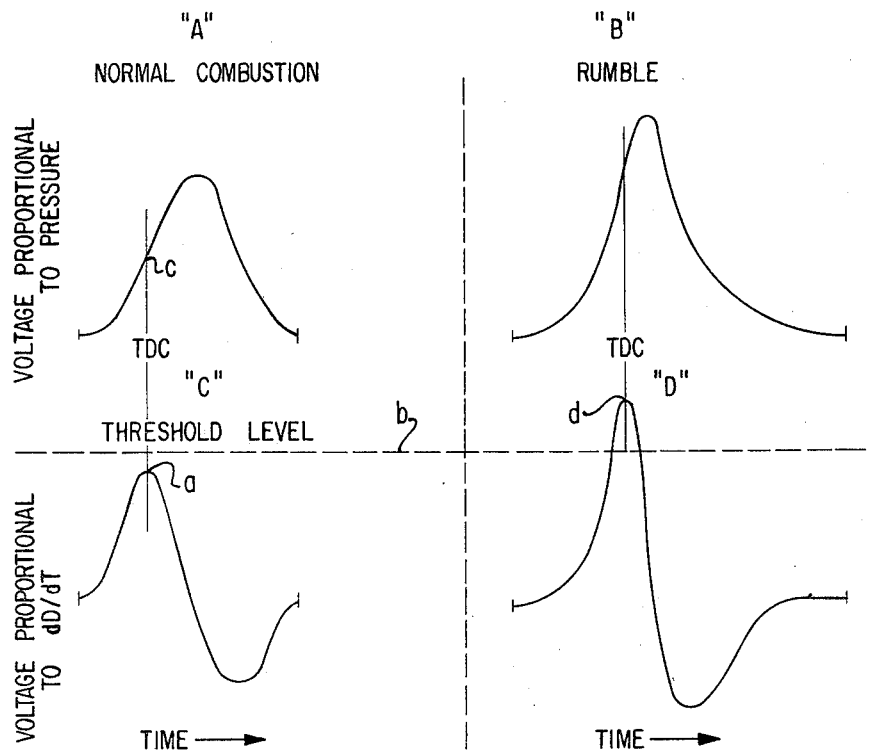
FIGURES 1A and 1B are graphs illustrating, respectively, pressure change under normal and rumble conditions, and FIGURES 1C and 1D, respectively, illustrate rate of pressure change under normal and rumble conditions.

FIGURES 1A and 1B illustrate the pressure-time patterns for normal combustion and rumble, respectively, which can occur in chamber 108. Pressure pickup 110 installed in the combustion chamber 108 will produce a voltage output that is proportional to the $dP/dt$ signal shown. FIGURES 1C and 1D are the $dP/dt$ patterns corresponding to the patterns of FIGURES 1A and 1B, respectively. The peak $a$ of the $dP/dt$ diagram of FIGURE 1C corresponds to the part $c$ of the pressure-time pattern of FIGURE 1A where the slope is the steepest, and the $dP/dt$ pickup produces a voltage output that is proportional to the rate of pressure change.

From the pickup 110, where the rate of pressure change $dP/dt$ is converted into electrical energy, the $dP/dt$ signal goes into an amplifier 112 that has been stabilized by negative feedback. After proper amplification the $dP/dt$ signal is fed into a level detector 114 which has a threshold level adjustor 116 connected thereto. The threshold level adjustor 116 can be set such that a pulse will be emitted from the level detector 114 as soon as a desired amplitude of the $dP/dt$ signal, e.g. between zero and a voltage E has been exceeded.

The threshold level $b$ in FIGURES 1C anad 1D, the threshold of the level detector 114, can be set by adjustor 116 such that it is higher than the peak $a$ of the voltage proportional to a normal combination or knock $dP/dt$, see FIGURE 1C, and correspondingly, no pulse will be emitted by level detector 114 for normal combustion or knock. In the case of rumble, however, the threshold level $b$ is exceeded by the voltage proportional to $dP/dt$ as at $d$, see FIGURE 1D, and correspondingly a pulse is emitted by the level detector 114. As shown in the paper "Rumble—A Deposit Effect at High Compression Ratios" by A. E. Felt, J. A. Warren, and C. A. Hall, presented at The Society of Automotive Engineers Summer Meeting, June 1958, the rate of pressure rise is substantially the same during normal combustion and during knock, but during rumble the rate of pressure rise is considerably higher. Thus, threshold level $b$ is set between the value of $dP/dt$ for normal combustion and knock and the value of $dP/dt$ for rumble.

Once a pulse has emerged from the level detector 114, it is fed to a one-shot multivibrator 118 where the duration of the output pulse is determined such that only one pulse per engine cycle can be fed to relay driver 120. This latter stage is desired because high frequency signals, caused by other abnormal combustion such as knock, can be superimposed on the pressure-time diagram and can trigger the level detector 114 more than once during a combustion cycle. The one-shot multivibrator 118 is triggered by the positive rise of its input, for example, coming from the level detector 114 and will stay in its "on" position for time $\Delta t$, determined by capacitor 122, so that once the one-shot multivibrator 118 has been triggered it will be insensitive to any other pulses fed into it for time $\Delta t$. The time $\Delta t$ of this mode, determined by capacitor 122, can be easily varied by changing the capacitor. Adjustment of the length of the triggered mode allows the apparatus to be used for detecting rumble at various engine speeds. Relay driver 120 activates one of counters 124 or 126 depending on whether switch 128 or 130 is closed by the programmer (see FIGURE 3) which determines the counter 124 or 126 to be energized by power supply 132. Each counter sums the number of pulses fed to it during the time the programmer holds it in a counting stage. The apparatus of FIGURE 2, illustrated in block diagram incorporates known and commercially available units so that further description is unnecessary.

Figure 3:
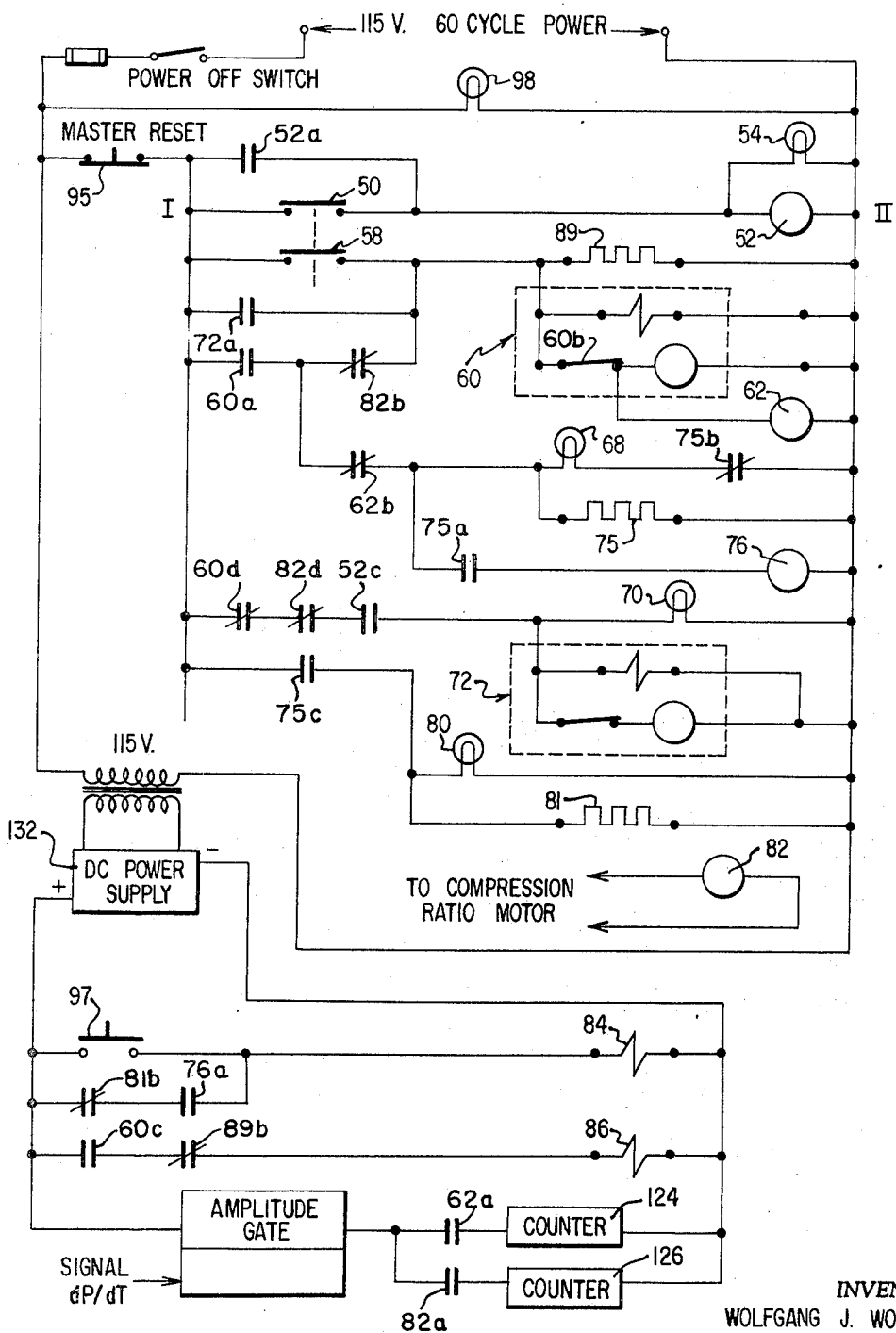
FIGURE 3 is a schematic illustration of a programmer for operation of the components of FIGURE 2.

Referring now to FIGURE 3, the programming part of the apparatus is designed to go through several steps in rating a fuel for its rumble characteristics and will be described with reference to its operation. The beginning of a test is initiated by pressing normally open, momentary contact switch 50 which simultaneously closes normally open, momentary contact switch 58. Switch 58 through the operation described below closes relay contact 62a for a predetermined time interval, e.g., 0 to 30 seconds. Closure of switch 50 energizes relay coil 52 which closes normally open contact 52a to maintain power, e.g., 115 volts, between points I and II. Relay 52 remains energized after release of start button 50 by curernt passing through contact 52a. Light 54 indicates when the power is on.

When switch 58 is closed, first timer 60 is actuated, and relay coil 62 is energized. Relay coil 62 is held energized for a predetermined time interval, e.g. from 0 to about 30 seconds as regulated by timer 60 which contains for example a time delay relay. After excitation has been provided to timer 60 for that predetermined time, normally closed contact 60b opens to de-energize relay coil 62. Relay coil 62, when energized, opens normally closed contact 62b and closes the normally open contact 62a which allows pulses to be fed to counter 124. Energization of timer 60 also closes normally open contact 60a which maintains a complete circuit through timer 60 after release of switch 58. During the period in which relay coil 62 is energized, all $dP/dt$ signals that exceed the amplitude set by the threshold level adjustor 116 in the level detector 114 will produce a pulse that is registered on counter 124.

After the predetermined time set by timer 60 has expired and contact 60b is opened, relay coil 62 is deenergized to open contact 62a and close contact 62b. Closure of contact 62b completes a circuit through light 68 and normally closed relay contact 75b and through thermal time delay relay 75. Light 68 indicates that is is time to read counter 124. After a time delay, e.g., 10 seconds, relay 75 closes normally open contact 75a to energize relay coil 76, opens normally closed contact 75b to turn off light 68, and closes normally open contact 75c to turn on light 80 which indicates that the compression ratio is being changed. The 10 second time delay provides time for the operator to record the reading on counter 124. Relay coil 76 closes normally open contact 76a to energize reset solenoid 84 which returns counter 124 to zero. Closure of normally open 75c energizes time delay element 81 which is also a thermal time delay relay. After a time delay (e.g. 2 seconds), element 81 opens normally closed contact 81b to de-energize reset solenoid 84. Time delay element 81 is included to prevent solenoid 84 from being damaged by feeding power to it for more than a few seconds since the reset solenoid contains an "intermittent duty" coil that can be damaged if it is energized for more than a few seconds. After recording the number of rumbles registered on counter 124, the operator changes the compression ratio (C.R.) on the engine by manually holding the switch (not shown) closed that feeds the power to the C.R. changing motor. The motor stops raising the C.R. as soon as the operator releases that switch. Relay 82 is energized and de-energized when the operator closes and releases, respectively, that switch. Relay 82, when energized, closes normally open contact 82a to allow pulses to be registered on counter 126. Accordingly, all pulses from the level detector will be fed to counter 126 as soon as the operator closes the compression-ratio changer switch. Relay coil 82, when energized, also opens normally closed contact 82b to reset timer 60 and opens normally closed, contact 82d to prevent operation of timer 72.

After the desired compression ratio is attained, the C.R. changing motor is turned off and relay coil 82 is de-energized. De-energization of relay 82 turns on light 70, which indicates that counter 126 should be read, and energizes timer 72 by allowing contact 82d to close since normally closed contact 60d is closed (timer 60 is de-energized) and normally open contact 52c is closed (relay coil 52 remains energized during operation of the system). After a predetermined interval, e.g., 0 to 60 seconds, which is required to stabilize the engine after the compression ratio change, as controlled by timer 72, the above process is repeated by the programmer for the second compression ratio automatically by closing of normally open contact 72a. Normally open contact 72a is closed by timer 72 after the delay to energize relay coil 62 and close contact 62a as described above. When contact 72a is closed, time delay relay 61 is energized. Energization of timer 60 closes normally open contact 60c to energize reset solenoid 86 and reset counter 126 to zero. After a 2 second delay, thermal time delay relay 89 opens normally closed contact 89b and de-energizes reset solenoid 86 for counter 126. A light 98 indicates when the main power, e.g., 115 v., is on. Master reset switch 95 de-energizes the entire programmer to place the system in condition to begin a test, including reset of counter 124 by closure of normally open switch 97, by cutting off the main power.

The test for a particular fuel may be ended either at some preselected compression ratio or when a preselected number of counts have ben recorded on counter 124 and/or 126. At the end of such a test involving one fuel the operator has a record of the number of rumbles on counter 124 that have occurred during a time interval set by timer 60 for several compression ratios as well as a record on counter 126 of the number of rumbles occurring during the times the compression ratio was being changed. Both sets of numbers are used to evaluate the rumble characteristics of a fuel.

It is claimed:

1. In combination with a combustion chamber for an internal combustion engine adapted to receive a combustible fuel mixture and ignition means for igniting said fuel mixture, an apparatus for detecting and rating the rumble tendencies of said fuels and their deposits comprising pulse transmission circuit means including means arranged for sensing the rate of pressure change in said chamber, means for developing a characteristic electrical signal when said rate of pressure change exceeds a predetermined threshold including component means adapted to limit said signals to one output signal per engine cycle, compression ratio adjustment signal means for said chamber, and counting means including a first counter, a second counter, and circuit means receiving as an input said output signal for separately energizing said two counters such that said first counter counts the signals developed at a constant compression ratio and said second counter counts the number of signals developed during adjustment of said compression ratio.

2. Apparatus as defined in claim 1 wherein said circuit means for energizing said counters includes timer means for energizing said first counter for a predetermined period of time.

3. Apparatus as defined in claim 1 wherein said means for energizing said counters includes switch means for actuating said second counter upon actuation of said compression ratio adjustment means.

4. Apparatus as defined in claim 3 wherein said means for energizing said counters further includes means for actuating said first counter means comprising first means for energizing said first counter for a predetermined period of time and second means for automatically actuating said first means a predetermined time interval after the adjusted compression ratio has been reached.

5. Apparatus as defined in claim 4 including means for resetting said second counter a predetermined time interval after said energization of said first means and means for resetting said first counter a predetermined time interval after de-energization of said first means.

6. A method for rating the rumble tendencies of a fuel during a period of operation in an internal combustion engine having a combustion chamber adapted to receive a combustible fuel mixture and means for igniting said mixture, comprising operating said engine at a first compression ratio for a first period of time, adjusting said ratio to a second compression ratio over a second period of time, operating said engine at said second ratio for a third period of time, detecting the rate of pressure change in said combustion chamber during said operation of the engine, developing a characteristic electrical signal when said rate of pressure change exceeds a predetermined rate and automatically counting said signals separately during said first, said second and said third periods of time as a record of the number of rumbles during said periods and at said first compression ratio, during said adjustment and at said second compression ratio.

7. In combination with a combustion chamber for an internal combustion engine adapted to receive a combustible fuel mixture and ignition means for igniting said fuel mixture, an apparatus for detecting and rating the rumble tendencies of said fuels and their deposits comprising pulse transmission circuit means including means arranged for sensing the rate of pressure change in said chamber, means for developing a characteristic electrical signal when said rate of pressure change exceeds a predetermined threshold including a one shot multivibrator adapted to be triggered when said rate of pressure change exceeds said predetermined rate and having means for maintaining the multivibrator in its triggered mode for a period of time corresponding to at least one combustion cycle for said engine, and means for counting said output signals.

References Cited

UNITED STATES PATENTS

| | | |
|---|---|---|
| 2,192,863 | 3/1940 | Hetzel et al. |
| 2,842,956 | 7/1958 | Uyehara et al. _____ 73—35 |
| 3,030,799 | 4/1962 | Hopkins _____ 73—35 |
| 3,126,733 | 3/1964 | Heigl et al. _____ 73—35 |
| 3,286,164 | 11/1966 | DeHuff _____ 73—35 XR |
| 3,289,462 | 12/1966 | Wostl _____ 73—35 |
| 2,496,337 | 2/1950 | De Boisblanc _____ 73—35 |
| 3,183,708 | 5/1965 | Roddick _____ 73—35 |
| 3,324,711 | 6/1967 | Wostl _____ 73—35 |

OTHER REFERENCES

An article by A. E. Felt et al. entitled "Rumble—A Deposit Effect at High Compression Ratios," presented at SAE Summer Meeting at Atlantic City, N.J., June 1958 (10 pages).

JAMES J. GILL, Primary Examiner